United States Patent
Go et al.

(10) Patent No.: US 7,215,779 B2
(45) Date of Patent: May 8, 2007

(54) INFORMATION PROVIDING APPARATUS AND METHOD, INFORMATION PROCESSING APPARATUS AND METHOD, AND PROGRAM STORAGE MEDIUM

(75) Inventors: Naomi Go, Kanagawa (JP); Akira Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/227,486

(22) Filed: Sep. 16, 2005

(65) Prior Publication Data
US 2006/0015720 A1 Jan. 19, 2006

Related U.S. Application Data

(63) Continuation of application No. 09/801,802, filed on Mar. 9, 2001, now Pat. No. 6,983,367.

(30) Foreign Application Priority Data
Mar. 14, 2000 (JP) ............................. 2000-069697

(51) Int. Cl.
*H04L 9/32* (2006.01)
*H04L 9/00* (2006.01)
(52) U.S. Cl. .................. 380/277; 713/189; 713/192
(58) Field of Classification Search .............. 380/277, 380/278, 279, 280; 713/189, 192–194
See application file for complete search history.

(56) References Cited

U.S. PATENT DOCUMENTS

| 5,347,580 A | 9/1994 | Molva et al. |
| 5,491,750 A * | 2/1996 | Bellare et al. ............. 713/155 |
| 5,495,533 A | 2/1996 | Linehan et al. |
| 5,761,306 A * | 6/1998 | Lewis ........................ 380/282 |
| 5,774,551 A | 6/1998 | Wu et al. |
| 5,963,642 A * | 10/1999 | Goldstein ................... 713/193 |
| 5,991,399 A | 11/1999 | Graunke et al. |
| 6,058,476 A | 5/2000 | Matsuzaki et al. |
| 6,061,799 A | 5/2000 | Eldridge et al. |
| 6,581,160 B1 | 6/2003 | Harada et al. |
| 2001/0039659 A1 | 11/2001 | Simmons et al. |

FOREIGN PATENT DOCUMENTS

| CN | 1170995 A | 1/1998 |
| JP | 10-51439 | 2/1998 |
| WO | WO 96/27155 | 9/1996 |
| WO | WO 00/11871 | 3/2000 |

OTHER PUBLICATIONS

Menezes et al., *Handbook of Applied Cryptography*, XP-002301330, 1997, (5 pgs.).

* cited by examiner

*Primary Examiner*—Hosuk Song
(74) *Attorney, Agent, or Firm*—Oblon, Spivak, McClelland, Maier & Neustadt, P.C.

(57) ABSTRACT

The present invention is intended to quickly download contents while preventing unauthorized contents usage. PD authentication program authenticates telephone-integrated terminal device. Server authentication program authenticate key server. Server LCM controls the reception of a request for data for identifying key server and a key from telephone-integrated terminal device. On the basis of the data for identifying key server, server LCM sends a request for the key to key server and receives the requested key from key server. Key distribution program sends the key to telephone-integrated terminal device.

14 Claims, 10 Drawing Sheets

INFORMATION PROVIDING APPARATUS AND METHOD, INFORMATION PROCESSING APPARATUS AND METHOD, AND PROGRAM STORAGE MEDIUM

BACKGROUND OF THE INVENTION

The present invention relates generally to an information providing apparatus and method, an information processing apparatus and method, and a program storage medium. More particularly, the present invention relates to an information providing apparatus and method, an information processing apparatus and method, and a program storage medium that provide a key for decrypting contents or use encrypted contents.

Referring to FIG. 1, there is shown a schematic diagram illustrating one configuration of a prior-art digital data transmission system. A personal computer 1 is connected to a communication network 4 constituted by a local area network or the Internet for example. The personal computer 1 receives music data (hereafter referred to as contents) from a contents server 22 or read from a CD (Compact Disk), compresses the received data by a predetermined compression scheme (for example, ATRAC3 (trademark)), encrypts them by a predetermined encryption algorithm such as DES (Data Encryption Standard), and records the resultant contents.

The personal computer 1 also records usage condition data indicative of the usage conditions of the recorded encrypted contents.

The usage condition data indicate the number of portable devices (also referred to as PDs), which can simultaneously use the contents compliant with the usage conditions (namely, the number of PDs that can checkout the contents, which will be described later), for example. When a piece of contents has been checked out by the number of times specified by the usage conditions, the personal computer 1 can reproduce this contents.

A display operation instructing program 11 of the personal computer 1 displays the data (for example, music title or usage conditions) associated with the contents recorded in the personal computer 1 and inputs a checkout instruction for example to make an LCD (Licensed Compliant Module) 12, a software module compliant with the SDMI (Secure Digital Music Initiative) standard, execute a checkout operation for example corresponding to the instruction.

The LCM 12 of the personal computer 1 is constituted by a group of modules which control the use of contents only when the usage conditions specified by the copyright holder of individual contents are satisfied, thereby preventing the copyright infringement based on noncompliant secondary use of the contents. The usage conditions include reproduction condition of the contents, copy condition, move condition, and accumulation condition.

The LCM 12 makes an authentication whether the devices connected to the personal computer 1 are compliant ones and executes the processing such as a movement of contents by a safe method. Along with this processing, the LCM generates a necessary key, manages the generated key, and encrypts the contents with this key, or controls the communication with the connected devices.

The LCM 12 also checks a loaded portable medium 3 for its validity, adds the usage conditions specified by a server 5 to the contents (encrypted), and stores the contents in the portable medium 3.

The LCM 12 of the personal computer 1 supplies the stored encrypted contents along with the data (for example, music title or usage conditions) associated with the contents to the a connected portable device 2 and accordingly updates the usage conditions (this update operation is hereafter referred to as a checkout). To be more specific, when a checkout is made, the permitted checkout count for the usage conditions for this contents is decremented by 1, the permitted checkout count being stored in the personal computer 1. When the checkout count is 0, the relevant contents cannot be checked out.

The portable device 2 stores in the loaded portable medium 3 the contents supplied from the personal computer 1 (namely, the checked out contents) along with the data (for example, a music title or usage conditions) associated with that contents.

The portable medium 3, incorporating a storage medium such as a flash memory, is constructed so as to detachably fit the portable device 2.

The portable device 2 reproduces the contents stored in the portable medium 3 on the basis of its usage conditions and outputs a reproduced signal to a headphone for example, not shown.

For example, if the user attempts the reproduction of a certain piece of contents stored in the portable device 2 in excess of a reproduction count set as a reproduction limit, the portable device 2 fails the attempt.

The user can remove the portable device 2 storing contents from the personal computer 1 to carry it about and reproduce the contents stored in the portable medium 3 to listen to the reproduced music for example by means of a headphone for example.

When the portable device 2 is connected to the personal computer 1 via a USB cable for example, the portable device 2 and the personal computer 1 cross-authenticate each other. This cross-authentication is based on a challenge-response scheme. In the challenge-response scheme, to a certain value (or a challenge) generated by the personal computer 1, the portable device 2 makes a response with a value (or a response) generated by use of a secret key shared by the personal computer 1.

A server 5 accumulates contents compressed and encrypted in predetermined algorithms and distributes the accumulated contents on demand from the personal computer 1. The server 5 have the capabilities of a key server 21, a contents server 22, and shop server 23.

The key server 21 accumulates contents keys for decrypting the contents supplied from the contents server 22 to the personal computer 1 and, in response to a request from the personal computer 1, supplies a relevant contents key to the personal computer 1. Before a contents key supply operation starts, the key server 21 and the personal computer 1 cross-authenticate each other. The key server 21 encrypts the contents key with a temporary key generated by the cross-authentication and sends the encrypted contents key to the personal computer 1. The personal computer 1 decrypts the received contents key with the shared temporary key.

Requested by the personal computer 1, the contents server 22 supplies the requested contents (encrypted) and its usage conditions to the personal computer 1 via a communication network 4.

The shop server 23 provides the digital data (including a contents list of music titles and prices for example) associated with the contents to be provided by the contents server 22 to the personal computer 1 and, in response to a contents purchase request from the personal computer 1, supplies the URL (Uniform Resource Locator) of the contents server 22 that supplies the requested contents and the URL of the key server 21 that supplies a contents key for decrypting the supplied contents to the personal computer 1.

The following describes a configuration of the capabilities of a prior-art digital data transmission system with reference to FIG. 2. In addition to the display operation instructing program 11 and the LCM 12, the personal computer 1 executes an IP (Internet Protocol) communication program 13, an ISP (Internet Service Provider) connection program 14, and a PHS (Personal Handyphone System)/IMT (International Mobile Telecommunication System) communication program 15.

The PHS/IMT communication program 15 is for communication to be executed via a public switched line network 31. The ISP connection program 14 is for connection to an ISP 32. The IP communication program 13 includes protocols such as HTTP (HyperText Transport Protocol) 71 and WAP (Wireless Access Protocol) 72 and makes communication with the key server 21, the contents server 22, or the shop server 23 via the communication network 4.

The LCM 12 consists of a license management program 51, a key management program 52, a contents management program 53, a key information receiving program 54, and a contents information receiving program 55.

The license management program 51 is for managing the usage of contents under the usage conditions of that contents and consists of a usage condition management program 61, a CD ripping program 62, a converter program 63 and a PD authentication program 64.

The usage condition management program 61 controls, on the basis of the usage conditions of contents, the permission or prohibition of the checkout of the contents stored in the personal computer 1 and updates the usage condition data as the contents is checked out. The CD ripping program 62 reads contents from a CD loaded in the personal computer 1 and generates the usage conditions relevant to the read contents.

The converter program 63 converts the encryption scheme or encoding scheme of contents. The PD authentication program 64 authenticates the portable device 2 loaded on the personal computer 1.

The key management program 52 authenticates the key server 21 and receives a contents key from the key server 21 to manage the received contents key in association with the contents. The key management program 52 consists of a server authentication program 65 and a receiving program 66.

The server authentication program 65 authenticates the key server 21 as will be described. The receiving program 66 receives a contents key from the key server 21 via the communication network 4.

The contents management program 53 receives contents and its usage condition data from the contents server 22 via the communication network 4 and record the received contents and its usage condition data. A receiving program 67 of the contents management program 53 receives the contents and its usage condition data from the contents server 22.

The key information receiving program 54 receives the URL of the key server 21 which supplies a contents key relevant to a desired piece of contents from the shop server 23. The contents information receiving program 55 receives, from the shop server 23, the contents ID for the contents requested by the user and the URL for identifying the contents server 22 that supplies the requested contents.

The portable device 2 executes a license management program 81, a key management program 82, and a contents management program 83.

The license management program 81 consists of a usage condition management program 91 for managing contents reproduction count on the basis of the usage conditions of the contents, a PC authentication program 92 for authenticating the personal computer 1, and a PM authentication program 93 for authenticating the portable medium 3.

The key management program 82 encrypts the contents key supplied from the personal computer 1 with a storage key stored in the portable medium 3 in advance and manages the encrypted contents key as stored in the portable medium 3.

The contents management program 83 manages the contents sent from the personal computer 1 as stored in the portable medium 3.

The portable medium 3 executes a license management program 101, a key management program 102, and a contents management program 103.

The license management program 101 has a PD authentication program 111 for authenticating the portable device 2 and stores the usage condition data of the contents, controlling the reading for example of the contents on the basis of the usage condition data. The key management program 102 encrypts the contents key supplied from the portable device 2 with the storage key stored in advance to manage the encrypted contents key. The contents management program 103 stores the contents supplied from the portable device 2 to manage the supplied contents.

The shop server 23 executes a key information sending program 121, a contents information sending program 122, a contents-access program 123, and an IP communication program 124.

The key information sending program 121 sends the URL of the key server 21 that supplies the contents key relevant to the contents requested by the user of the personal computer 1 to the personal computer 1 via the communication network 4.

The contents information sending program 122 sends the URL of the contents server 22 that supplies the contents requested by the user of the personal computer 1 to the personal computer 1 via the communication network 4.

The browsing program 123 consists of a viewing program 131 by which the user of the personal computer 1 can view and listen to the contents and a search program 132 by which the user of the personal computer 1 can search for desired pieces of contents.

The IP communication program 124 includes protocols such as HTTP 133 and WAP 134 for example and communicates with the personal computer 1 via the communication network 4.

The key server 21 executes an authentication program 151, a key distribution program 152, a key storage program 153, a key generation program 154, and an IP communication program 155.

The authentication program 151 authenticates the personal computer 1 for example. The key distribution program 152 distributes contents keys stored in the key storage program 153 to the authenticated personal computer 1. The key storage program 153 stores contents keys generated by the key generation program 154. The key generation program 154 generates contents keys in association with particular pieces of contents.

The IP communication program 155 includes protocols such as HTTP 171 and WAP 172 to communicate with the personal computer 1 for example via the communication network 4.

The contents server 22 executes a contents storage program 191, a contents distribution program 192, and an IP communication program 193.

The contents storage program 191 stores the contents encrypted by the contents key in association with contents IDs. The contents distribution program 191 distributes, upon request from the personal computer 1, the contents corresponding to the contents ID stored in the contents storage program 191 to the personal computer 1.

The IP communication program 193 includes protocols such as HTTP 201 and WAP 202 to communicate with the personal computer 1 via the communication network 4.

The following describes the processing in which the personal computer 1 downloads contents and checks out the downloaded contents to the portable device 2, with reference to the flowcharts shown in FIGS. 3 and 4. In step S101, the PHS/IMT communication program 15 of the personal computer 1 establishes a connection with the public switched line network 31. In step S201, a ground station for example, not shown, in the public switched line network 31 establishes a connection with the personal computer 1.

In step S102, the ISP connection program 14 of the personal computer 1 establishes a connection with the ISP 32. In step S301, the ISP 32 establishes a connection with the personal computer 1.

In step S103, the IP communication program 13 of the personal computer 1 establishes an IP communication with the shop server 23. In step S401, the IP communication program 124 of the shop server 23 establishes an IP communication with the personal computer 1.

In step S402, the contents-access program 123 of the shop server 23 sends the digital data for browsing (for contents selection) to the personal computer 1 via the communication network 4. In step S104, a browser program, not shown, of the personal computer 1 displays the image or text corresponding to the received digital data for browsing by the user. The browser program of the personal computer 1 also has capabilities of allowing the user to test-view the downloaded contents in a stream reproduction manner and the contents-access program 123 of the shop server 23 to search for a particular piece of contents by keyword to display the search results. The processes of steps S402 and S104 are repeated in accordance with the request by the user of the personal computer 1.

In step S105, the browser program of the personal computer 1 sends a purchase request to the shop server 23. In step S403, the contents-access program 123 of the shop server 23 receives the purchase request from the personal computer 1.

In step S404, the contents information sending program 122 of the shop server 23 sends, to the personal computer 1 via the network 4, the contents information including the URL of the contents server 22 that distributes the contents specified in the purchase request received in step S403. In step S106, the contents information receiving program 55 of the personal computer 1 receives the contents information from the shop server 23.

In step S405, the key information sending program 121 of the shop server 23 sends, to the personal computer 1 via the network 4, the key information such as the URL of the key server 21 that distributes the contents key of the contents specified in the purchase request received in step S403. In step S107, the key information receiving program 54 of the personal computer 1 receives the key information from the shop server 23.

In step S108, the IP communication program 13 of the personal computer 1 establishes an IP communication with the contents server 22 by use of the URL of the contents server 22 included in the contents information obtained in step S106. In step S501, the IP communication program 193 of the contents server 22 establishes an IP connection with the personal computer 1.

In step S109, the contents management program 53 of the personal computer 1 sends the contents ID obtained in step S106 to the contents server 22 via the communication network 4. In step S502, the contents server 22 receives the contents ID from the personal computer 1. In step S503, the contents distribution program 192 of the contents server 22 reads the contents (encrypted) corresponding to the contents ID received in step S502 from the contents storage program 191 and distributes the contents to the personal computer 1 via the communication network 4. In step S110, the receiving program 67 of the contents management program 65 of the personal computer 1 receives the contents from the contents server 22.

In step S111, the IP communication program 13 of the personal computer 1 establishes an IP communication with the key server 21 on the basis of the URL of the key server 21 contained in the key information obtained in step S107. In step S601, the IP communication program 155 of the key server 21 establishes an IP communication with the personal computer 1.

In step S112, the server authentication program 65 of the key management program 52 of the personal computer 1 authenticates the key server 21. In step S602, the authentication program 151 of the key server 21 authenticates the personal computer 1.

The key server 21 stores a master key KMS in advance and the personal computer 1 stores a private key KPP and the ID of the personal computer 1 in advance. The personal computer also stores a master key KMP in advance and the key server 21 also stores its ID and private key KPS in advance.

The key server 21 receives the ID of the personal computer 1 from the personal computer 1 and applies a hash function to the received ID and the master key KMS of the key server 21 to generate a same key as the private key KPP of the personal computer 1.

The personal computer 1 receives the ID of the key server 21 from the key server 21 and applies a hash function to the received ID and the master key KMP of the personal computer 1 to generate a same key as the private key KPS of the key server 21. Consequently, the common private key is shared between the personal computer 1 and the key server 21. By use of these private keys, a temporary key is generated.

In step S113, the key management program 52 of the personal computer 1 sends a contents ID to the key server 21. In step S603, the key server 21 receives the contents ID from the personal computer 1. In step S604, the key distribution program 152 of the key server 21 reads the contents key stored in the key storage program 153 in association with the contents ID and sends this contents key (encrypted by the temporary key) to the personal computer 1. In step S114, the receiving program 66 of the key management program 52 of the personal computer 1 receives the contents key from the key server 21. The key management program 52 decrypts the received contents key with the temporary key.

When the user of the personal computer 1 instructs the display operation instructing program 11 to check out the received contents, the processes of steps S115 and the subsequent processes are executed.

In step S115, the PD authentication program 64 of the license management program 51 of the personal computer 1 authenticates the portable device 2. In step S701, the PC authentication program 92 of the license management program 81 of the portable device 2 authenticates the personal computer 1.

The cross-authentication processes between the personal computer 1 and the portable device 2 in step S115 and step S701 is based on a challenge-response scheme. As compared with the cross-authentication between the key server 21 and the personal computer 1 in step S112 and step S602, the challenge response scheme needs less computational load. The personal computer 1 and the portable device 2 each generate a temporary key from the response by a same computational operation and share the generated temporary key.

In step S116, the contents management program 53 of the personal computer 1 distributes the encrypted contents to the portable device 2. In step S702, the contents management program 83 of the portable device 2 receives the contents from the personal computer 1 and supplies the received contents to the contents management program 103 of the portable medium 3. The contents management program 103 of the portable medium 3 stores the received contents.

It should be noted that the portable device 2 and the portable medium 3 cross-authenticate with other when the portable medium 3 is loaded in the portable device 2.

In step S117, the key management program 52 of the personal computer 1 distributes the contents key (encrypted with the temporary key shared between the portable device 2 and the portable medium 3) corresponding to the contents distributed in step S116 to the portable device 2. In step S703, the key management program 82 of the portable device 2 receives the contents key from the personal computer 1 and supplies the received contents key to the key management program 102 of the portable medium 3. The key management program 102 of the portable medium 3 decrypts the received contents key and stores the decrypted contents key.

SUMMARY OF THE INVENTION

As described, the prior-art is smaller in computational capabilities and storage size than those of the personal computer 1. For example, if the portable terminal device attempts to download contents from the contents server 22 and a corresponding contents key from the key server 21, the large authentication load lowers the processing speed too much to realize sufficient practical use.

It is therefore an object of the present invention to provide quick contents downloading capabilities for practical use while preventing any unauthorized contents usage even with a limited processing capability.

In carrying out the invention and according to one aspect thereof, there is provided an information providing apparatus comprising: a first authentication means for authenticating a first information processing unit; a second authentication means for authenticating a second information processing unit; a reception control means for controlling the reception of a transmission request for data for identifying the second information processing unit and a key from the first information processing unit; a communication control means for controlling the communication such that a transmission request for the key on the basis of the data for identifying the second information processing unit is sent to the second information processing unit and the key is received from the second information processing unit; and a transmission control means for controlling the transmission of the key to the first information processing unit.

In carrying out the invention and according to another aspect thereof, there is provided an information providing method comprising the steps of: authenticating a first information processing unit; authenticating a second information processing unit; controlling the reception of a transmission request for data for identifying the second information processing unit and a key from the first information processing unit; controlling the communication such that a transmission request for the key on the basis of the data for identifying the second information processing unit is sent to the second information processing unit and the key is received from the second information processing unit; and controlling the transmission of the key to the first information processing unit.

In carrying out the invention and according to still another aspect thereof, there is provided a program storage medium storing a computer-readable program comprising the steps of: authenticating a first information processing unit; authenticating a second information processing unit; controlling the reception of a transmission request for data for identifying the second information processing unit and a key from the first information processing unit; controlling the communication such that a transmission request for the key on the basis of the data for identifying the second information processing unit is sent to the second information processing unit and the key is received from the second information processing unit; controlling the transmission of the key to the first information processing unit.

In carrying out the invention and according to yet another aspect thereof, there is provided an information processing apparatus comprising: an authentication means for authenticating a first information providing unit; a transmission control means for controlling the transmission of a transmission request to the first information providing unit for data for identifying a second information providing unit that provides a key and the key; and a reception control means for controlling the reception of the key provided and transmitted to the first information providing unit from the second information providing unit.

In carrying out the invention and according to a different aspect thereof, there is provided an information processing method comprising the steps of: authenticating a first information providing unit; controlling the transmission of a transmission request to the first information providing unit for data for identifying a second information providing unit that provides a key and the key; controlling the reception of the key provided and transmitted to the first information providing unit from the second information providing unit.

In carrying out the invention and according to a still different aspect thereof, there is provided a program storage medium storing a computer-readable program comprising the steps of: authenticating a first information providing unit; controlling the transmission of a transmission request to the first information providing unit for data for identifying a second information providing unit that provides a key and the key; controlling the reception of the key provided and transmitted to the first information providing unit from the second information providing unit.

As one example, the first information processing unit is authenticated, the second information processing unit is authenticated, the reception, from the first information processing unit, of the transmission request for data for identifying the second information processing unit and a key is controlled, the transmission request for the key is sent to the second information processing unit on the basis of the data for identifying the second information processing unit, the reception of the key from the second information processing unit is controlled, and the transmission of the key to the first information processing unit is controlled.

As another example, the first information providing unit is authenticated, the transmission of a transmission request for data for identifying the second information providing unit that provides a key and the key to the first information providing unit is controlled, the key is provided from the second information providing unit to the first information providing unit, and the reception of the provided key is controlled.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

Figure 1:
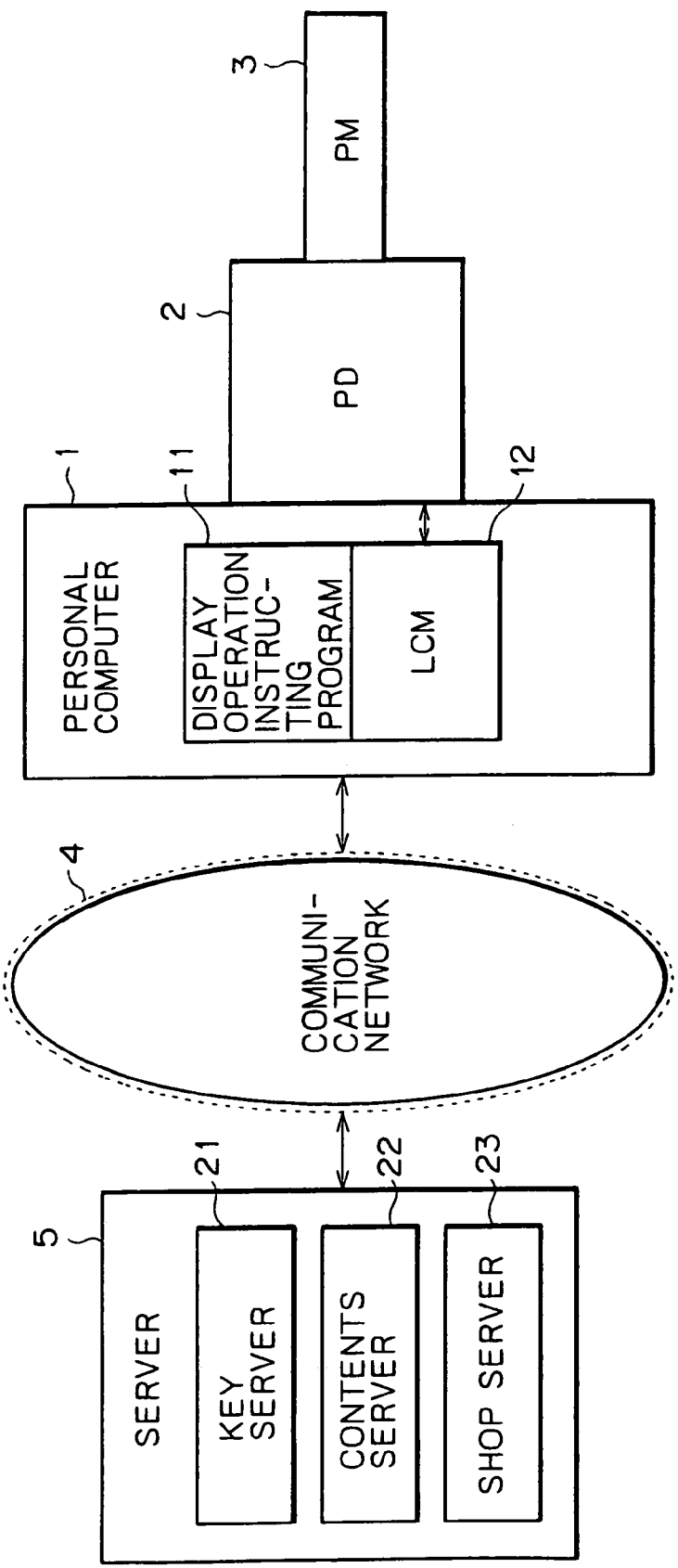
FIG. 1 is a schematic diagram illustrating a configuration of a conventional digital data transmission system.
Figure 5:
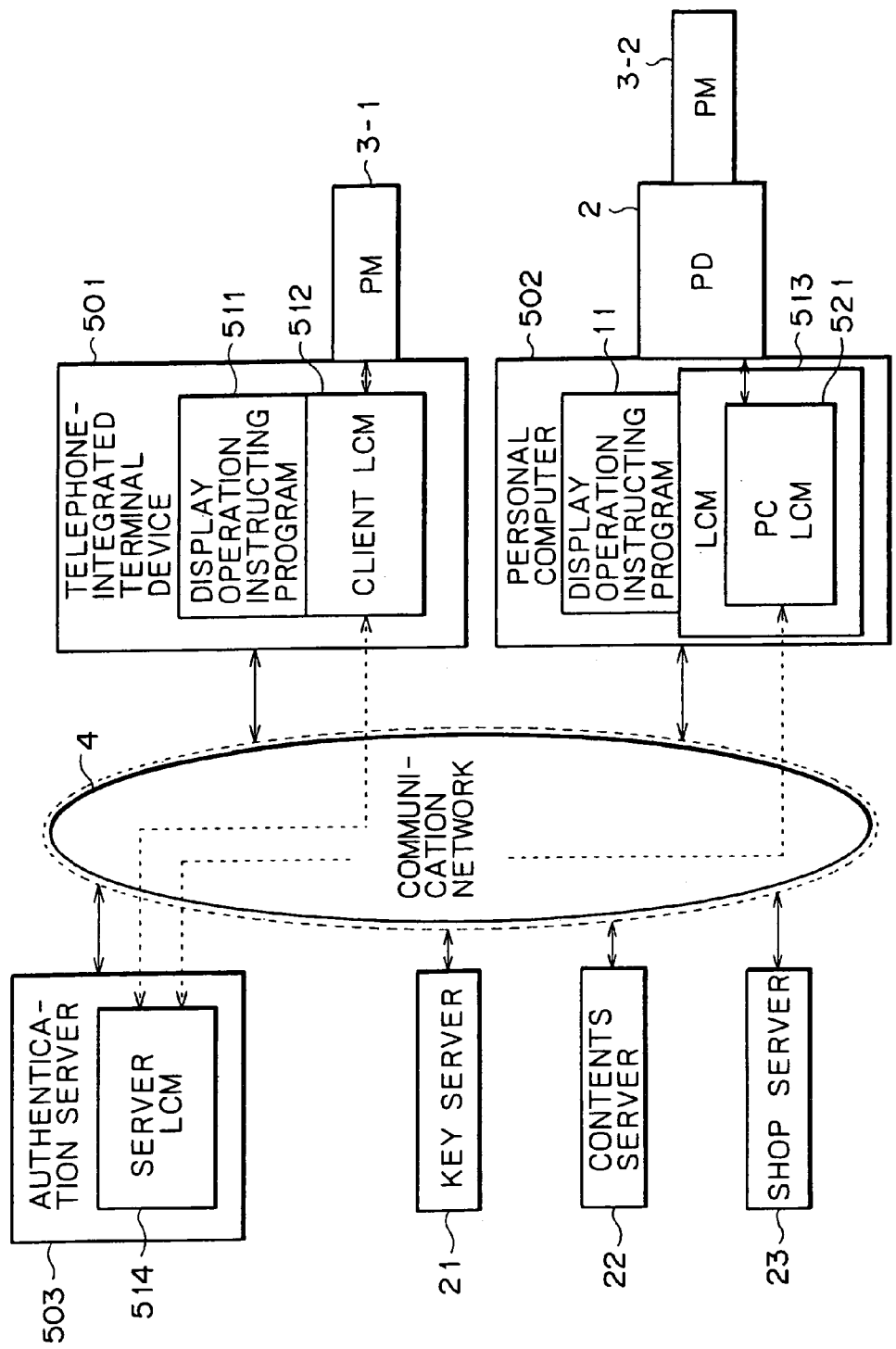
FIG. 5 is a schematic diagram illustrating one embodiment of a digital data transmission system associated with the present invention.

Referring to FIG. 5, there is shown one embodiment of a digital data transmission system associated with the present invention. With reference to FIG. 5, components similar to those previously described with FIG. 1 are denoted by the same reference numerals and their descriptions will be skipped.

A telephone-integrated terminal device 501 is constructed so as to detachably accommodate a portable medium 3-1 and is connected to a communication network 4 in a wireless manner. The telephone-integrated terminal device 501 downloads contents (compressed and encrypted in predetermined schemes) received from a contents server 22 via the communication network 4 and stores the downloaded contents into the loaded portable medium 3-1 along with data such as usage conditions of the contents.

On the basis of the usage condition data associated with the contents, the telephone-integrated terminal device 501 reproduces the contents stored in the portable medium 3-1 and outputs the reproduction to a headphone or speaker, not shown. Carrying about the telephone-integrated terminal device 501, its user can download any desired piece of contents at any desired place to store the downloaded contents into the portable medium 3. The user makes the telephone-integrated terminal device 501 reproduce the contents stored in the portable medium 3 to listen to the music for example pertinent to the contents by means of the headphone for example.

A display operation instructing program 511 of the telephone-integrated terminal device 501 displays the contents-related data (for example, music titles or usage conditions) and, when the user inputs a download instruction, makes a client LCM 512 to execute the corresponding processing. The client LCM 512 of telephone-integrated terminal device 501 executes a sequence of processes (to be described later) for downloading contents and its usage conditions for example, in cooperation with a server LCM 514 of a authentication server 503.

In order to prevent the copyright violation due to noncompliant secondary usage of contents, the client LCM 512 of the telephone-integrated terminal device 501 is constituted by a group of modules which control the use of contents only when the usage conditions specified by the copyright holder of individual contents are satisfied, thereby preventing the copyright infringement based on noncompliant secondary use of the contents. The usage conditions include reproduction condition of the contents, copy condition, move condition, and accumulation condition.

The client LCM 512 makes an authentication whether the portable medium 3-1 loaded in the telephone-integrated terminal device 501 is compliant one and adds the usage condition data specified by the server 5 in a secure manner to the contents (encrypted), storing the contents into the portable medium 3-1. With the movement of contents, the client LCM 512 generates necessary keys, manages them, and controls the communication with the connected portable medium 3-1.

A personal computer 502 is connected to the communication network 4. The personal computer 502 converts the compression scheme and encryption scheme of the contents received from the contents server 22 or read from a CD into a predetermined compression scheme and a predetermined encryption scheme such as DES, storing the resulting contents. The personal computer 502 records the data of usage conditions of the encrypted and recorded contents.

The display operation instructing program 11 of the personal computer 502 displays the contents-associated data (for example, music titles or usage conditions) and, when a download instruction or a checkout instruction is inputted by the user, makes an LCM 513 of the personal computer 502 execute a corresponding download operation or checkout operation.

The LCM 513 of the personal computer 502 is constituted by a group of modules which control the use of contents only when the usage conditions specified by the copyright holder of individual contents are satisfied, thereby preventing the copyright infringement based on noncompliant secondary use of the contents. The usage conditions include reproduction condition of the contents, copy condition, move condition, and accumulation condition.

The LCM 513 makes an authentication whether the portable device 2 connected to the personal computer 502 is compliant one and executes a contents movement process for example in a secure manner. With the movement of contents, the LCM 513 generates necessary keys, manages them, and encrypts contents or controls the communication with the connected device.

Also, the LCM 513 checks the validity of the portable device 2. When the portable medium 3-2 is loaded, the portable device 2 checks the validity of the portable medium 3-2. If the portable device 2 and the portable medium 3-2 are found valid, the LCM 513 adds the usage condition data specified by the server 5 to the contents (encrypted) and checks out the resultant contents to the portable medium 3-2. The portable device 2 stores the contents checked out from the personal computer 502 into the loaded portable medium 3-2 along with the contents-associated data.

If the authentication server 503 is available, a PC LCM 521 (constituted by part or all of the functionality of the LCM 513) of the personal computer 502 executes a sequence of processes for downloading contents and its usage conditions in cooperation with the server LCM 514 of the authentication server 503.

If the authentication server 503 is unavailable, the LCM 513 of the personal computer 502 authenticates a key server 21 as with the LCM 12 to download contents and its usage conditions.

The authentication server 503 executes the server LCM 514 to authenticate the key server 21 in response to a request from the cross-authenticated telephone-integrated terminal device 501 or the cross-authenticated personal computer 502. After cross-authentication with the key server 21, the authentication server 503 receives contents key from the key server 21 and supplies the received contents key to the telephone-integrated terminal device 501 or the personal computer 502.

The telephone-integrated terminal device 501 or the personal computer 502 does not require the authentication with the key server 21 and can obtain a corresponding contents key only by executing the authentication with the authentication server 503 which is lower in processing load than the authentication with the key server 21.

Figure 6:
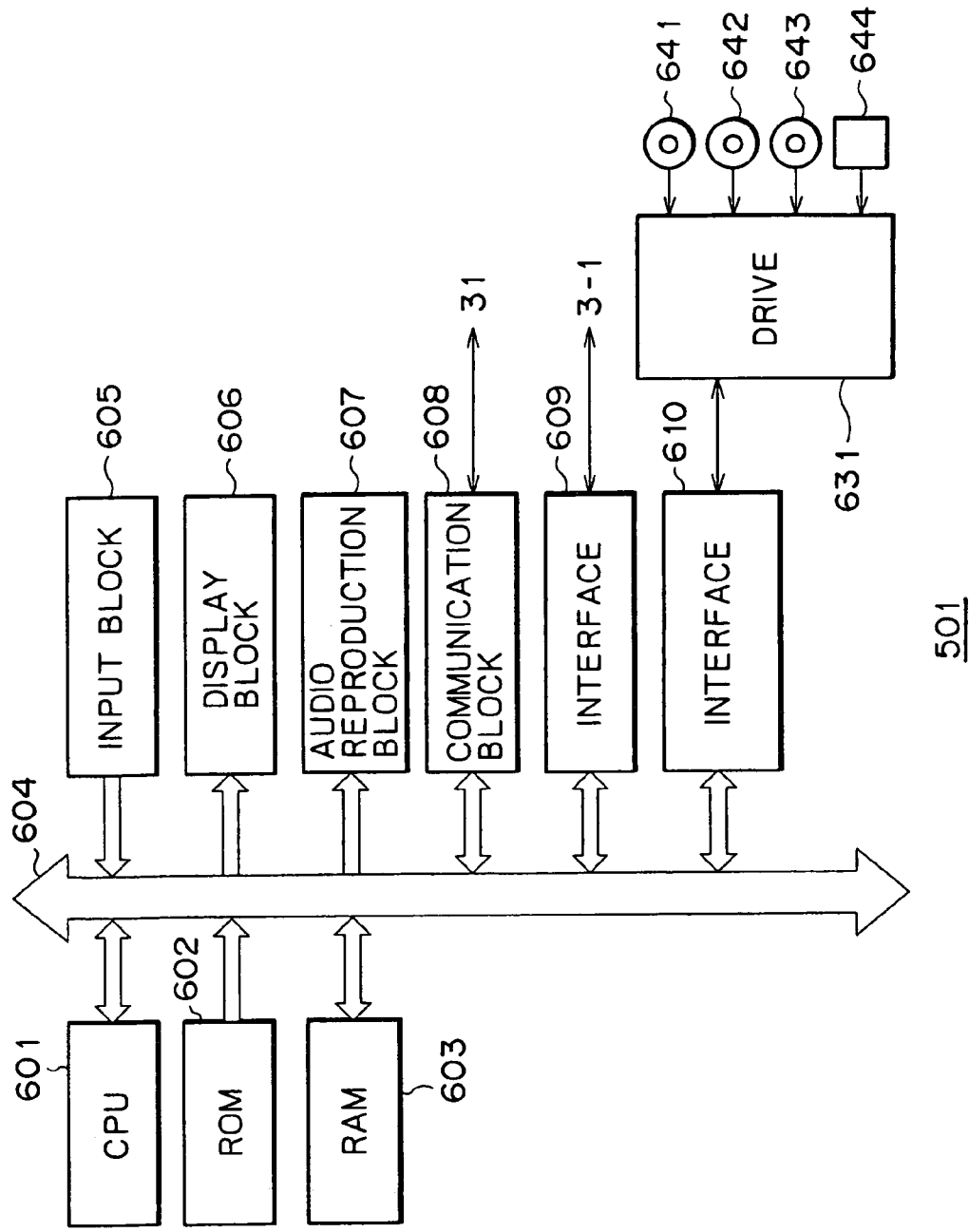
FIG. 6 is a block diagram illustrating a configuration of telephone-integrated terminal device.

FIG. 6 shows a configuration of the telephone-integrated terminal device 501. A CPU (Central Processing Unit) 601 executes programs stored in a ROM (Read Only Memory) 602 or a RAM (Random Access Memory) 603. The ROM 602, constituted by an EEPROM (Electrically Erasable Programmable Read Only Memory) or a flash memory, generally stores programs and basically fixed data of computational parameters to be used by the CPU 601. The RAM 603, constituted by an SRAM (Static Random Access Memory) for example, stores programs to be used by the CPU 601 in its execution and parameters which changes from time to time in the execution.

An input block 605, constituted by an input key or a microphone, is operated by the user when inputting commands into the CPU 601 or inputting a voice. A display block 606, constituted by a liquid crystal display device, displays various kinds of information in the form of text or image.

An audio reproduction block 607 reproduces the voice data of the other party supplied from a communication block 608 or the contents supplied from the portable medium 3-1 via an interface 609 and sounds the reproduced voice signal.

The communication block 608 connects to the public switched line network 31 and stores in predetermined packets the data (for example, a contents send request) supplied from the CPU 601 or the voice data of the user supplied from the input block 605 and sends the packets via the public switched line network 31. Also, the communication block 608 outputs the data (for example, contents) stored in received packets or the voice data of the other party received via the public switched line network 31 to the CPU 601, the RAM 603, the audio reproduction block 607, or the interface 609.

The interface 609 stores the data supplied from the CPU 601, the RAM 603, or the communication block 608 into the portable medium 3-1 and reads data such as contents from the loaded portable medium 3-1 to supply the data to the CPU 601, the RAM 603, or the audio reproduction block 607.

An interface 610 is connected to an externally attached drive 631. The drive 631 reads data or programs from a magnetic disk 641, an optical disk (including a CD-ROM) 642, a magneto-optical disk 643, or a semiconductor memory 644, which is loaded in the drive 631, and supplies these data or programs to the ROM 602 or the RAM 603 via the interface 610 and a bus 604.

The components, the CPU 601 through the interface 610, are interconnected by the bus 604.

Figure 7:
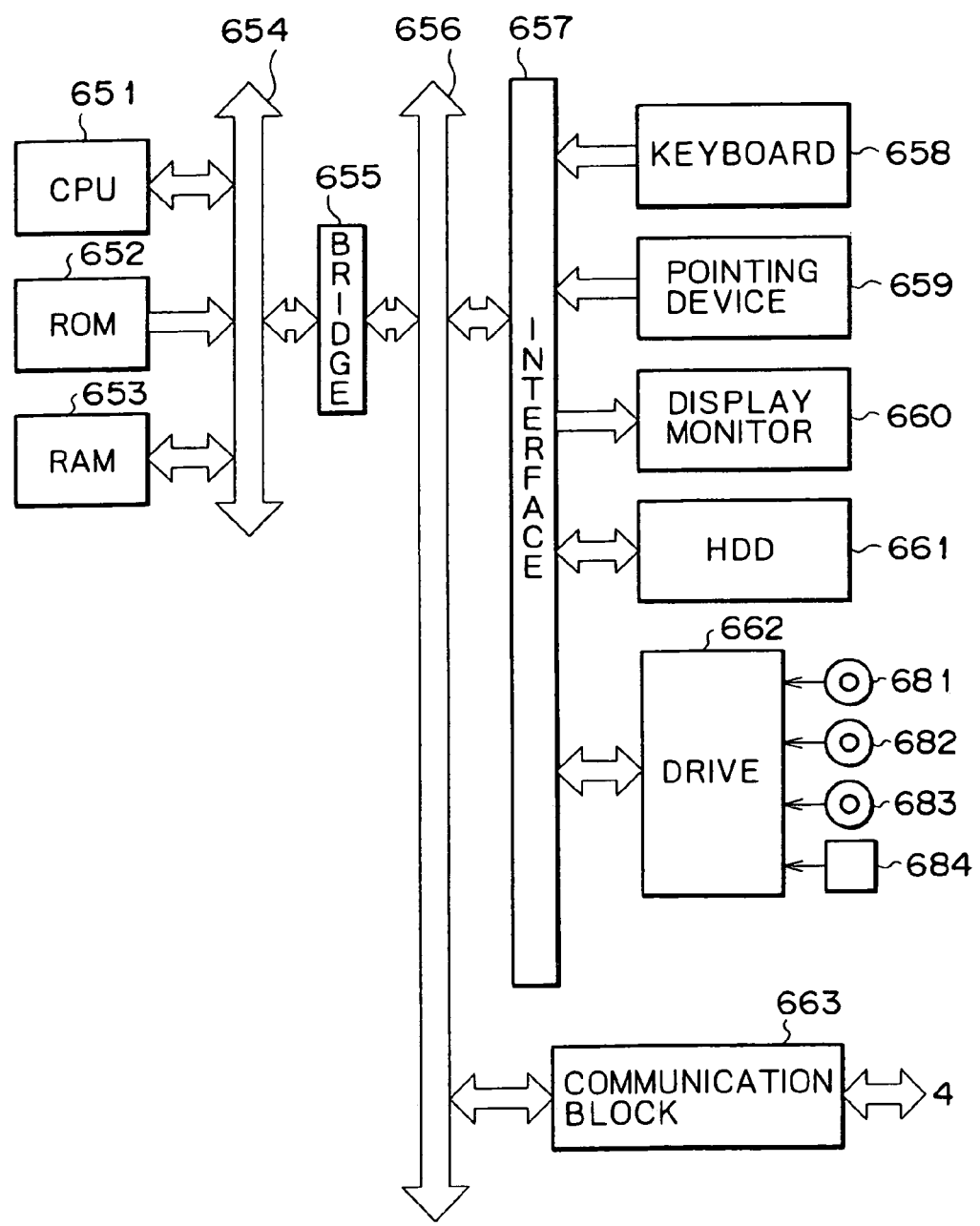
FIG. 7 is a block diagram illustrating a configuration of authentication server.

FIG. 7 shows an internal configuration of the authentication server 503. A CPU 651 executes various application programs (which will be detailed later) and an OS (Operating System). A ROM 652 generally stores programs and basically fixed data of computational parameters to be used by the CPU 651. A RAM 653 stores programs to be used by the CPU 651 in its execution and parameters which changes from time to time in the execution. These are interconnected by a host bus 654 constituted by a CPU bus for example.

The host bus 654 is connected to an external bus 656 such as a PCI (Peripheral Component Interconnect/Interface) bus via a bridge 655.

A keyboard 658 is operated by the user when inputting commands into the CPU 651. A pointing device 659 is operated by the user when indicating a point on a display monitor 660 or selecting items thereon. The display monitor 660, constituted by a liquid crystal display device or a CRT (Cathode Ray Tube), shows various information in text and image. A HDD (Hard Disk Drive) 661 drives a hard disk to record or read programs and information to be used by the CPU 651 to or from the hard disk.

A drive 662 reads data or programs stored on a magnetic disk 681, an optical disk 682, a magneto-optical disk 683, or a semiconductor memory 684, which is loaded in the drive 662, and supplies these data or programs to the RAM 653 via the interface 657, the external bus 656, the bridge 655, and the host bus 654.

These components, the keyboard 658 through the drive 662, are connected to the interface 657 which is connected to the CPU 651 via the external bus 656, the bridge 655, and the host bus 654.

A communication block 663, connected to the communication network 4, stores data (for example, a contents key) supplied from the CPU 651 or the HDD 661 into predetermined packets and send them over the communication network 4 and, at the same time, outputs the data (for example, the contents ID) stored in received packets over the network 4 to the CPU 651, the RAM 653, or the HDD 661.

The communication block 663 is connected to the CPU 651 via the external bus 656, the bridge 655, and the host bus 654.

Figure 2:
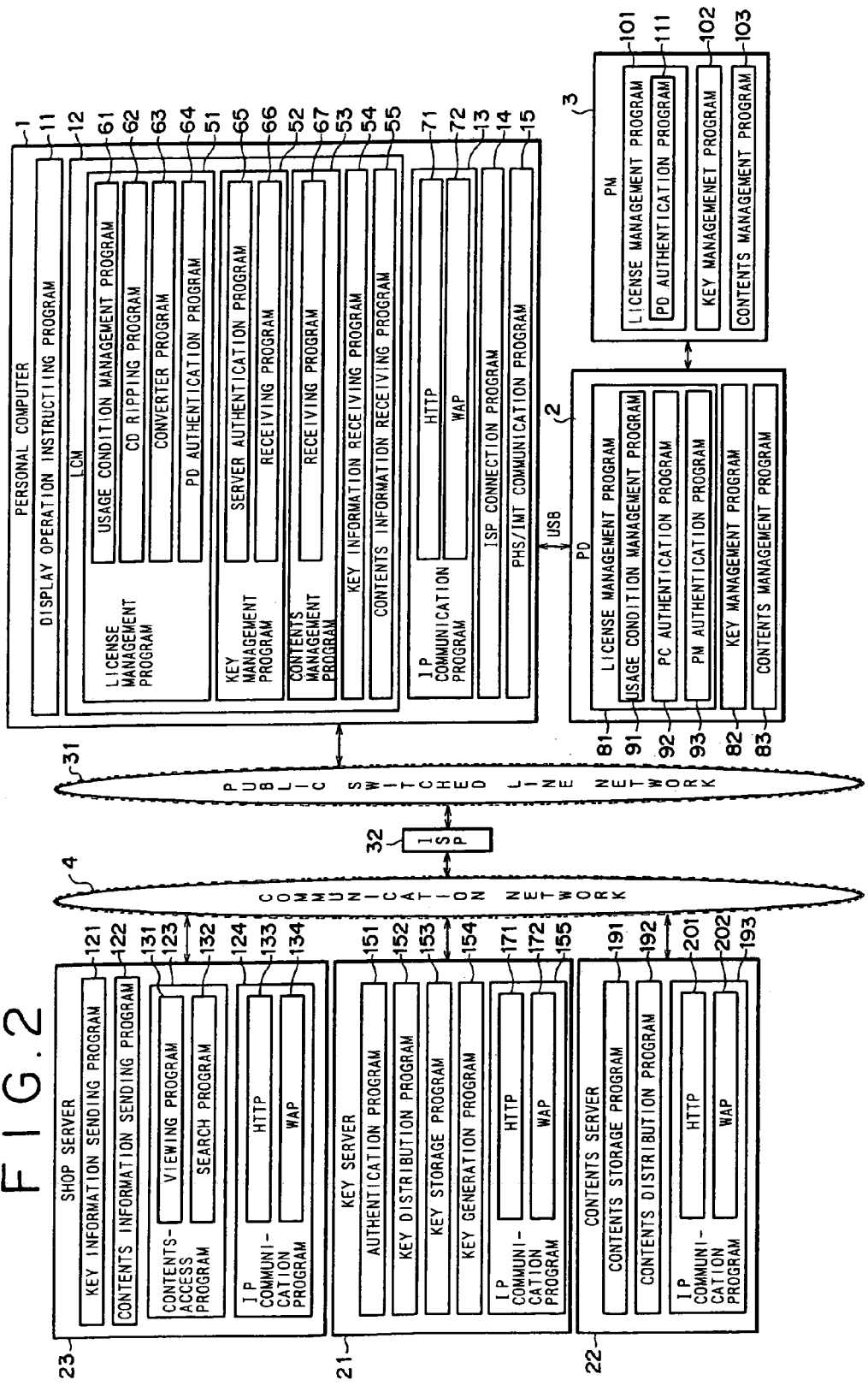
FIG. 2 is a schematic diagram illustrating a functional configuration of the conventional digital data transmission system.
Figure 3:
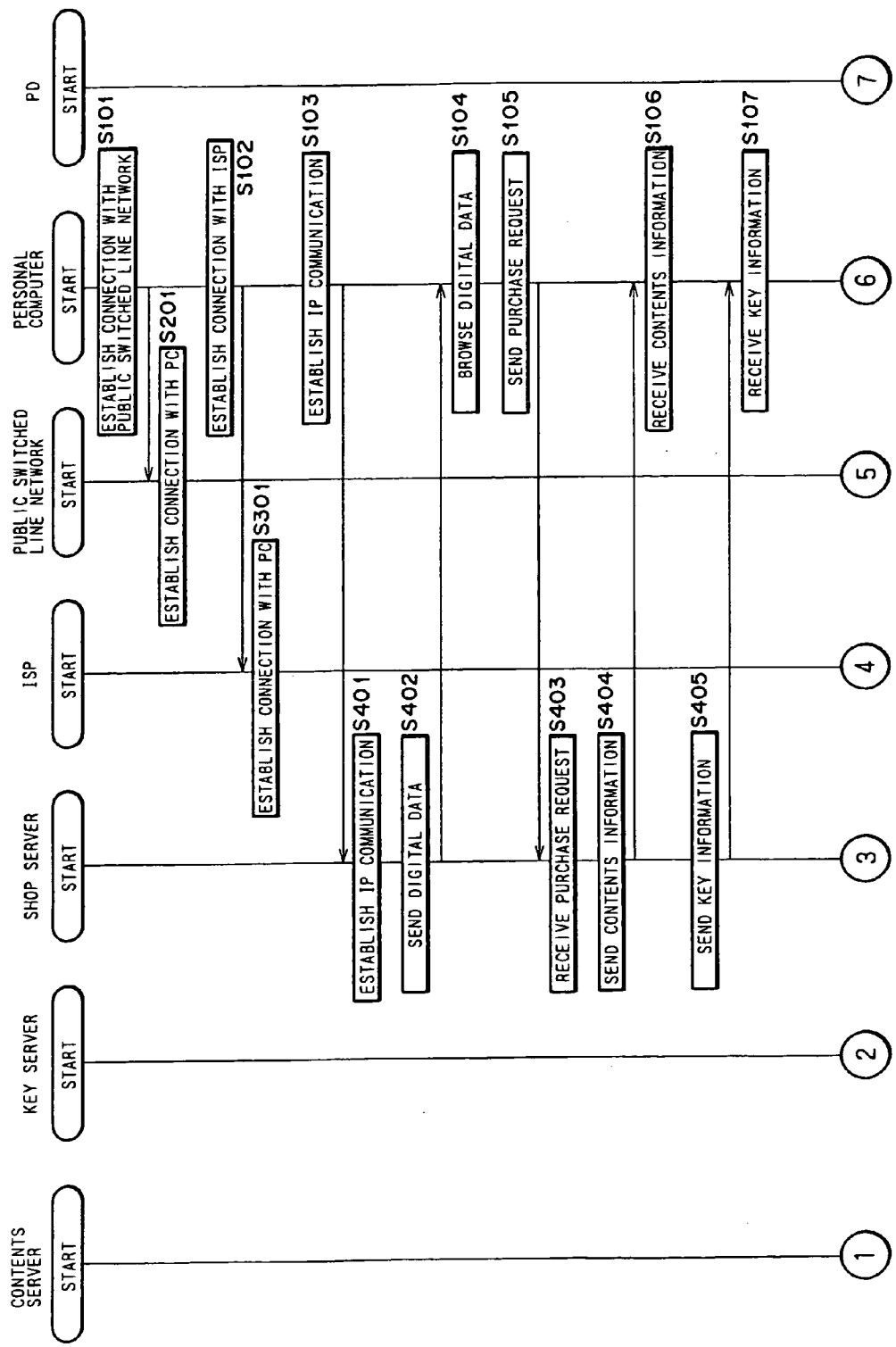
FIG. 3 is a flowchart describing processing in which personal computer downloads contents and checks out the downloaded contents to portable device.
Figure 4:
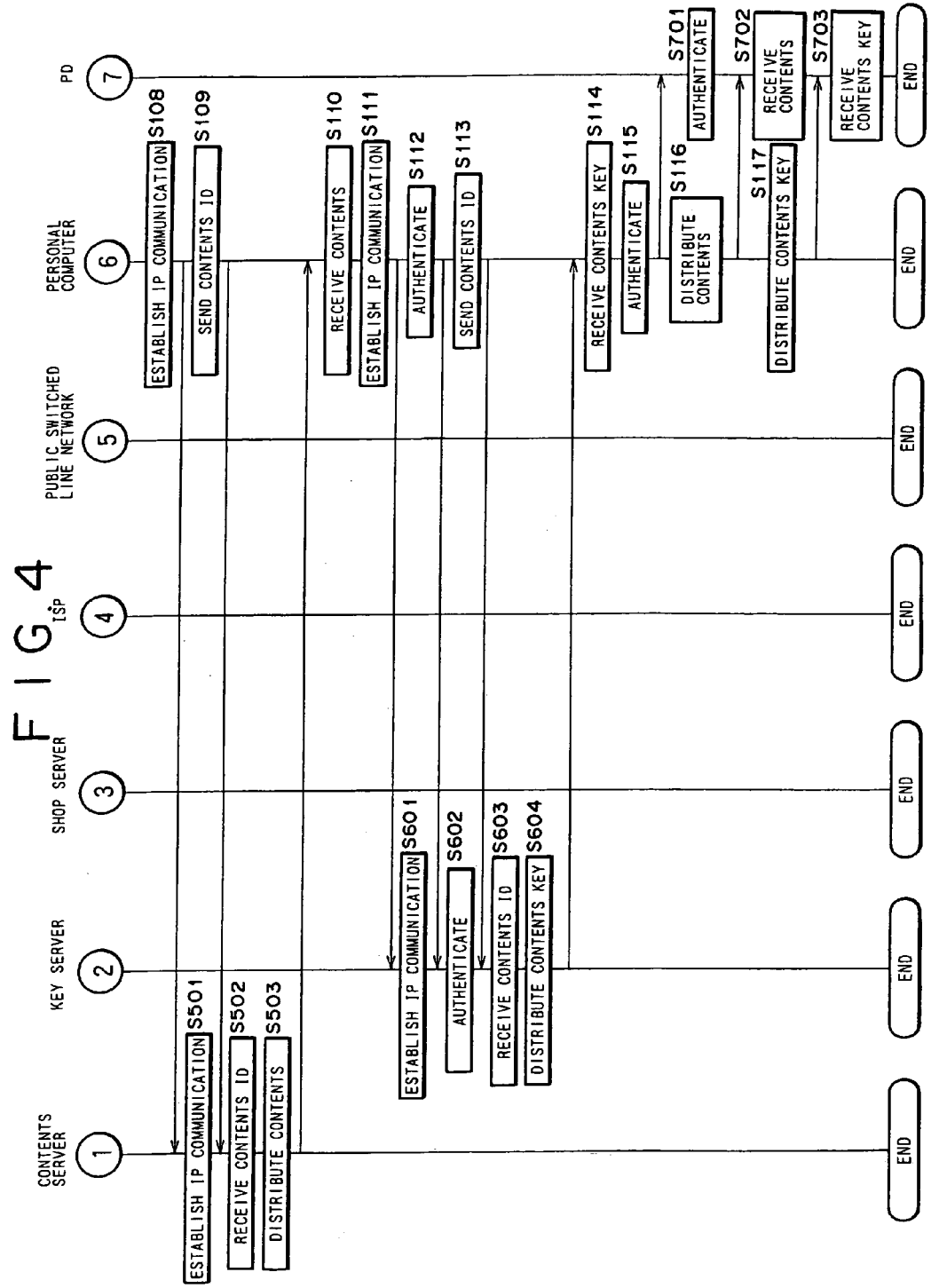
FIG. 4 is a flowchart describing processing in which personal computer downloads contents and checks out the downloaded contents to portable device.
Figure 8:
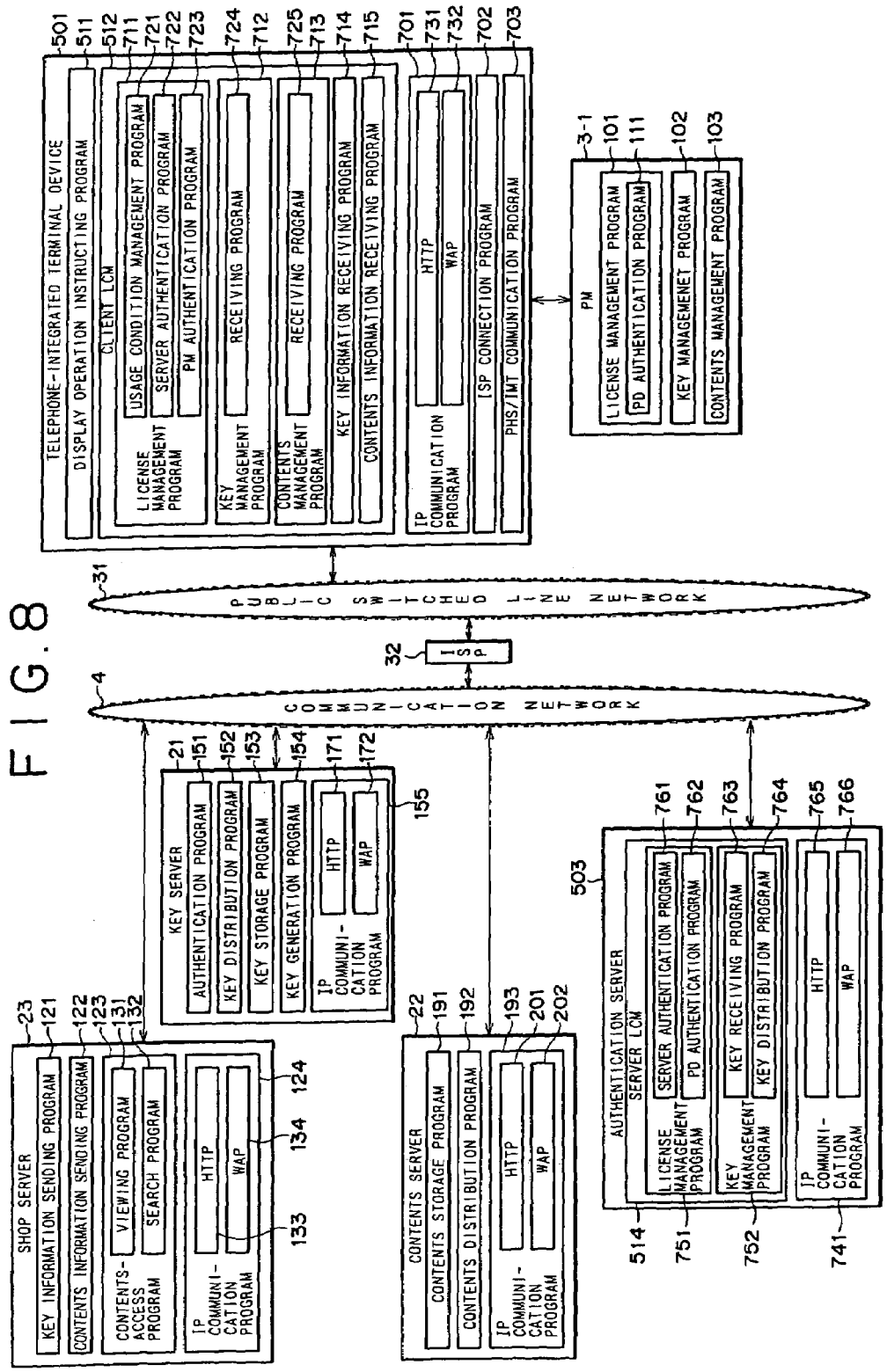
FIG. 8 is a schematic diagram illustrating a functional configuration of the digital data transmission system associated with the present invention.

The following describes a functional configuration of the digital data transmission system associated with the present invention with reference to FIG. 8. With reference to FIG. 8, components similar to those previously described with FIG. 2 are denoted by the same reference numerals and therefore their descriptions will be skipped.

The telephone-integrated terminal device 501 executes a display operation instructing program 511, a client LCM 512, an IP communication program 701, an ISP connection program 702, and a PHS/IMT communication program 703.

The PHS/IMT communication program 703 makes communication via the public switched line network 31. The ISP connection program makes connection to the ISP 32. The IP communication program 701 includes protocols such as HTTP 731 and WAP 732 and makes communication with the key server 21, the contents server 22, the shop server 23, or the authentication server 503 via the communication network 4.

The client LCM 512 is composed of a license management program 711, a key management program 712, a contents management program 713, a key information receiving program 714, and contents information receiving program 715.

The license management program 711 manages the use of contents on the basis of contents usage conditions and is composed of a usage condition management program 721, a server authentication program 722, and a PM authentication program 723.

The usage condition management program 721 control the permission or prohibition of the reproduction of the contents stored in the portable medium 3-1 and makes the portable medium 3-1 update the usage condition data stored in the portable medium 3-1 as the contents stored in the portable medium 3-1 is reproduced. The server authentication program 722 authenticates the authentication server 503 via the communication network 4. The PM authentication program 723 authenticates the portable medium 3-1 when the portable medium 3-1 is loaded in the telephone-integrated terminal device 501.

The key management program 712 receives a contents key from the authentication server 503 and manages the contents key by storing it into the portable medium 3-1 in association with the corresponding contents. The key management program 712 includes a receiving program 724 for receiving contents keys from the authentication server 503.

The contents management program 713 receives contents (encrypted) and its usage conditions from the contents server 22 and stores the received contents and its usage conditions into the portable medium 3-1. The receiving program 725 of the contents management program 713 receives contents and its usage conditions from the contents server 22.

The key information receiving program 714 receives the URL identifying the key server 21 for supplying the contents key corresponding to the contents from the shop server 23. The contents information receiving program 715 receives the URL for identifying the contents server 22 for supplying a desired piece of contents and the contents ID for identifying it from the shop server 23.

The authentication server 503 executes the server LCM 514 and the IP communication program 741.

The server LCM 514 includes a license management program 751 and a key management program 752.

The license management program 751 includes a server authentication program 761 for authenticating the key server 21 and a PD authentication program 762 for authenticating the telephone-integrated terminal device 501.

The key management program 752 includes a key receiving program 763 for receiving contents keys from the key server 21 via the communication network 4 and a key distribution program 764 for distributing the received contents keys to the telephone-integrated terminal device 501 via the communication network 4.

The IP communication program 741 includes protocols HTTP 765 and WAP 766 and makes communication with the key server 21 or the telephone-integrated terminal device 501 via the communication network 4.

Figure 9:
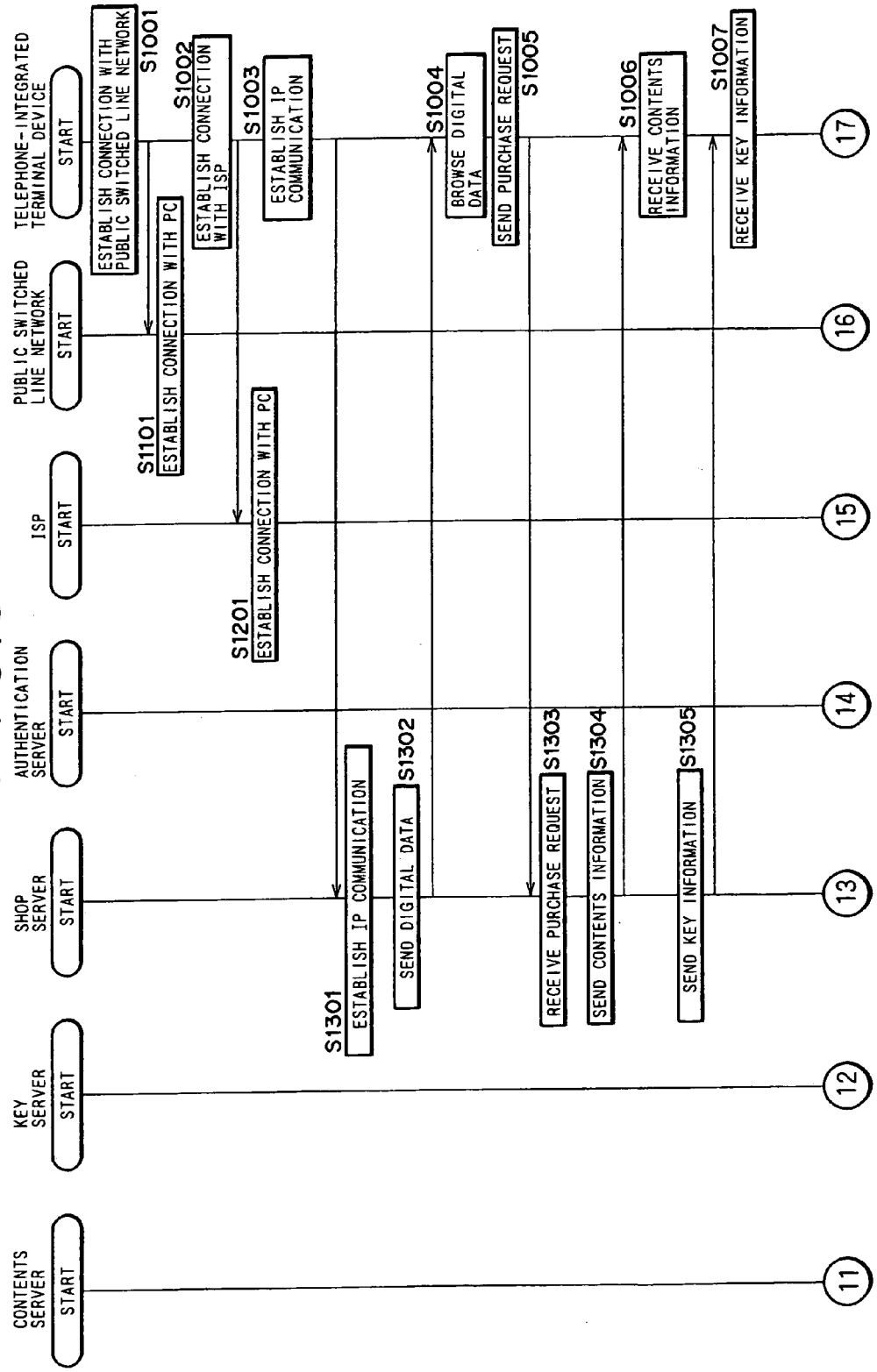
FIG. 9 is a flowchart describing processing in which telephone-integrated terminal device downloads contents.
Figure 10:
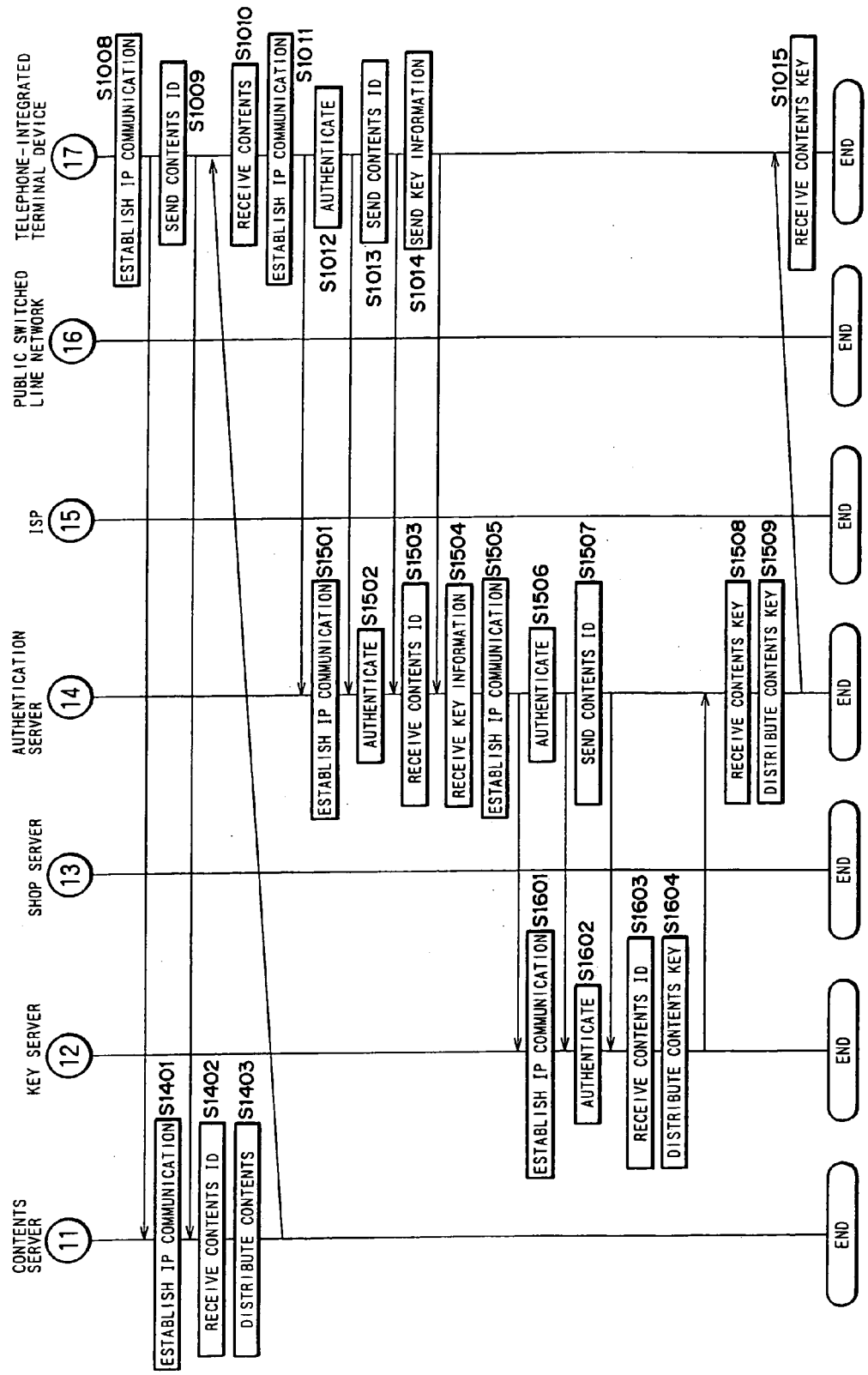
FIG. 10 is a flowchart describing processing in which telephone-integrated terminal device downloads contents.

The following describes a process in which the telephone-integrated terminal device 501 downloads contents with reference to the flowcharts shown in FIGS. 9 and 10. In step S1001, the PHS/IMT communication program 703 of the telephone-integrated terminal device 501 establishes communication with the public switched line network 31. In step S1101, the ground station for example, not shown, of the public switched line network 31 establishes a connection with the telephone-integrated terminal device 501.

In step S1002, the ISP connection program 702 of the telephone-integrated terminal device 501 establishes a connection with the ISP 32 via the connection between the telephone-integrated terminal device 501 and the public switched line network 31. In step S1201, the ISP 32 establishes connection with the telephone-integrated terminal device 501 via the connection between the telephone-integrated terminal device 501 and the public switched line network 31.

The subsequent processes between the telephone-integrated terminal device 501 and the key server 21, the contents server 22, the shop server 23 or the authentication server 503 are executed via the connection between the telephone-integrated terminal device 501 and the ISP 32.

In step S1003, the IP communication program 701 of the telephone-integrated terminal device 501 establishes IP communication with the shop server 23. In step S1301, the IP communication program 124 of the shop server 23 establishes IP communication with the shop server 23.

In step S1302, the contents-access program 123 of the shop server 23 send digital data for viewing (or for contents selection) to the telephone-integrated terminal device 501 via the communication network 4. In step S1004, a browser program, not shown, of the telephone-integrated terminal device 501 displays the text or image corresponding to the received digital data onto the display block 606 for viewing by the user. The browser program of the telephone-integrated terminal device 501 also makes the audio reproduction block 607 reproduce the contents in a streaming reproduction manner for the test-listening by the user or the contents-access program 123 of the shop server 23 search for a desired piece of contents on the basis of a keyword inputted by the user, displaying the results on the display block 606.

The processes of steps S1302 and S1004 are repeated for a request by the user of the telephone-integrated terminal device 501, until the user determines the contents to be purchased for example.

In step S1005, the browser program of the telephone-integrated terminal device 501 sends a purchase request to the shop server 23 via the communication network 4. In step S1303, the contents-access program 123 of the shop server 23 receives the purchase request sent from the telephone-integrated terminal device 501.

In step S1304, in response to the purchase order received in step S1303, a contents information sending program 122 of the shop server 23 sends, to the telephone-integrated terminal device 501 via the communication network 4, the contents information including the URL of the contents server 22 for distributing the contents and the contents ID for identifying the contents. In step S1006, the contents information receiving program 715 of the telephone-integrated terminal device 501 receives the contents information from the shop server 23.

In step S1305, the key information sending program of the shop server 23 sends, to the telephone-integrated terminal device 501 via the communication network 4, the key information such as the URL of the key server 21 that distributes the contents key of the contents specified in the purchase request received in step S1303. In step S1007, the key information receiving program 714 of the telephone-integrated terminal device 501 receives the key information sent from the shop server 23.

In step S1008, the IP communication program 701 of the telephone-integrated terminal device 501 establishes IP communication with the contents server 22 on the basis of the URL of the contents server 22 included in the contents information obtained in step S1006. In step S1401, the IP communication program 193 of the contents server 22 establishes IP communication with the telephone-integrated terminal device 501.

In step S1009, the contents management program 713 of the telephone-integrated terminal device 501 sends the contents ID obtained in step S1006 to the contents server 22 via the communication network 4. In step S1402, the contents server 22 receives the contents ID sent from the telephone-integrated terminal device 501. In step S1403, the contents distribution program 192 of the contents server 22 reads the contents (encrypted) corresponding to the contents ID received in step S1402 from the contents storage program 191 and distributes the contents to the telephone-integrated terminal device 501 via the communication network 4.

In step S1010, the receiving program 725 of the contents management program 713 of the telephone-integrated terminal device 501 receives the contents sent from the contents server 22. The contents management program 713 supplies the received contents to the portable medium 3-1 over the interface 609 and makes the contents management program 103 store the contents.

In step S1011, the IP communication program 701 of the telephone-integrated terminal device 501 establishes IP communication with the authentication server 503 on the basis of the URL of the key server 21 obtained in step S1007. In step S1501, the IP communication program 741 of the authentication server 503 establishes IP communication with the telephone-integrated terminal device 501.

In step S1012, the server authentication program 722 of the license management program 711 of the telephone-integrated terminal device 501 authenticates the authentication server 503. In step S1502, the PD authentication program 762 of the license management program 751 of the authentication server 503 authenticates the telephone-integrated terminal device 501.

The cross-authentication processes between the telephone-integrated terminal device 501 and the authentication server 503 in step S1012 and step S1502 are executed in a challenge and response scheme. As compared with the cross-authentication between the key server 21 and the personal computer 1 in step S112 and step S602, the challenge response scheme needs less computational load and therefore provides quick execution with less computational performance and storage size. The telephone-integrated terminal device 501 and the authentication server 503 each generate a temporary key from the response by a same computational operation and share the generated temporary key.

If the cross-authentication in steps S1012 and S1502 fails (namely, the other party of the cross-authentication is found invalid), the process of downloading the contents by the telephone-integrated terminal device 501 ends without downloading the contents.

In step S1013, the key management program 712 of the telephone-integrated terminal device 501 sends the contents ID to the authentication server 503. In step S1503, the authentication server 503 receives the contents ID supplied from the telephone-integrated terminal device 501. In step S1014, the key management program 712 of the telephone-integrated terminal device 501 sends the key information received in step S1007 to the authentication server 503. In step S1504, the authentication server 503 receives the key information supplied from the telephone-integrated terminal device 501.

In step S1505, the IP communication program 741 of the authentication server 503 establishes IP communication with the key server 21. In step S1601, the IP communication program 155 of the key server 21 establishes IP communication with the authentication server 503.

In step S1016, the server authentication program 761 of the license management program 751 of the authentication server 503 authenticates the key server 21. In step S1602, the authentication program 151 of the key server 21 authenticates the authentication server 503.

For example, the key server 21 stores a master key KMSS in advance and the authentication server 503 stores a private key KPCC and the ID of the authentication server 503 beforehand. In addition, the authentication server 503 stores a master key KMCC in advance and the key server 21 stores the ID of the key server 21 and a private key KPSS.

The key server 21 receives the ID of the authentication server 503 therefrom and applies a hash function to the received ID and the master key KMSS of the key server 21, generating a same key as the private key KPCC of the authentication server 503.

The authentication server 503 receives the ID of the key server 21 therefrom and applies a hash function to the received ID and the master key KMCC of the authentication server 503, generating a same key as the private key KPSS of the key server 21. Consequently, the common key is shared between the authentication server 503 and the key server 21. By use of these private keys, a temporary key is generated.

If the authentication in step S1506 or step S1602 fails (namely, if the other party of the authentication is found invalid), the contents download processing by the telephone-integrated terminal device 501 ends without downloading the specified contents, so that the telephone-integrated terminal device 501 cannot use the contents.

In step S1507, the key management program 752 of the authentication server 503 sends the contents ID obtained in step S1503 to the key server 21. In step S1603, the key server 21 receives the contents ID supplied from the authentication server 503. In step S1604, the key distribution program 152 of the key server 21 reads the contents key stored in the key storage program 153 in association with the contents ID and sends the contents key (encrypted by the temporary key shared between the key server 21 and the authentication server 503) to the authentication server 503. In step S1508, the key receiving program 763 of the key management program 752 of the authentication server 503 receives the contents key sent from the key server 21.

In step S1509, the key distribution program 764 of the key management program 752 of the authentication server 503 decrypts the contents key received in step S1508 by the temporary key shared between the key server 21 and the authentication server 503 and then encrypts the contents key by the temporary key shared between the telephone-integrated terminal device 501 and the authentication server 503, sending the resultant contents key to the telephone-integrated terminal device 501 over the communication network 4. In step S1015, the receiving program 724 of the key management program 712 of the telephone-integrated terminal device 501 receives the contents key sent from the authentication server 503. The key management program 712 decrypts the received contents key by the temporary key shared between the telephone-integrated terminal device 501 and the authentication server 503 and supplies the decrypted contents key to the key management program 102 of the portable medium 3 to store the contents key therein.

The cross-authentication between the telephone-integrated terminal device 501 and the authentication server 503 in steps S1012 and S1502 requires less computational quantify than the cross-authentication between the telephone-integrated terminal device 501 and the key server 21 and no high computational capabilities or large storage size. Therefore, the telephone-integrated terminal device 501 can quickly download contents for use even with a limited processing capacity while preventing any unauthorized contents usage by the cross-authentication.

Moreover, the telephone-integrated terminal device 501 can store contents into the portable medium 3 as soon as the contents has been download. Therefore, the user need not instruct the telephone-integrated terminal device 501 to do such operations as contents checkout, thereby being able to use the contents without spending time and effort.

In addition, the server LCM 514 may be updated (for example, version upgrading) concentratedly and promptly by the administrator of the authentication server 503. Further, the client LCM 512 is smaller in size than the prior-art LCM 12 (for example, the server authentication program 722 can be implemented in a smaller scale than the prior-art server authentication program 65). Therefore, the telephone-integrated terminal device 501 can update the client LCM 512 significantly quickly.

It should be noted that, when the authentication server 503 is available, the PC LCM 521 of the personal computer 502 executes the same processing as that of the client LCM 512 of the telephone-integrated terminal device 501. If the authentication server 503 is unavailable, the LCM 513 of the personal computer 502 executes the same processing as that of the prior-art LCM 12.

In the above, contents has been described to be music data. It will be apparent to those skilled in the art that contents may also be still picture data, moving picture data, text data, or a program.

In the above, the telephone-integrated terminal device 501 or the personal computer 502 download contents. It will be apparent to those skilled in the art that a mobile telephone, a PDA (Personal Digital Assistant), a digital video cassette recorder having communication and imaging capabilities, an electronic notepad having communication capabilities, or a portable personal computer may download contents, in addition to the telephone-integrated terminal device 501 and the personal computer 502.

In the above, the telephone-integrated terminal device 501 makes necessary communication by means of PHS or IMT. It will be apparent to those skilled in the art that the telephone-integrated terminal device 501 alternatively may make communication by means of W-CDMA (Code Division Multiple Access), satellite communication, satellite broadcasting, PSTN (Public Switched Telephone Network), xDSL (x Digital Subscriber Line), ISDN (Integrated Services Digital Network), or a private network.

The above-mentioned sequences of processes can be executed by hardware or software. The execution by software is supported by a computer in which the programs constituting the software are installed in a dedicated hardware device beforehand or by a general-purpose personal computer capable of executing various capabilities in which these programs are installed from the program storage medium.

The program storage medium for storing computer-readable and executable programs may be a package medium constituted by the magnetic disk 641 or 681 (including floppy disk), the optical disk 642 or 682 (including CD-ROM (Compact Disk-Read Only Memory) and DVD (Digital Versatile Disk)), the magneto-optical disk 643 or 683 (including MD (Mini Disk)), or the semiconductor memory 644 or 684 or the ROM 602 or 652, or the HDD 661 on which the programs are stored temporarily or permanently as shown in FIG. 8 or 9. Programs are stored in the program storage medium from wired or wireless communication media such as a local area network, the Internet, and digital satellite broadcasting through the communication block 608 or 663 as required.

It should be noted that the steps describing the programs to be stored in the program storage medium are not only executed in a time-dependent manner in the order described, but also in parallel or in a discrete manner.

It should also be noted that the system as used herein denotes an entire apparatus constituted by a plurality of component units.

In the information providing apparatus recited in claim 1, the information providing method recited in claim 8, and the program storage medium recited in claim 15, the first information processing unit is authenticated, the second information processing unit is authenticated, the reception, from the first information processing unit, of the transmission request for data for identifying the second information processing unit and a key is controlled, the transmission request for the key is sent to the second information processing unit on the basis of the data for identifying the second information processing unit, the reception of the key from the second information processing unit is controlled, and the transmission of the key to the first information processing unit is controlled. Consequently, the first information processing unit can quickly download contents for use even with a limited processing capacity while preventing any unauthorized contents usage.

In the information processing apparatus recited in claim 16, the information processing method recited in claim 23, and the program storage medium recited in claim 30, the first information providing unit is authenticated, the transmission of a transmission request for data for identifying the second information providing unit that provides a key and the key to the first information providing unit is controlled, the key is provided from the second information providing unit to the first information providing unit, and the reception of the provided key is controlled. Consequently, even with a limited processing capacity, the system can quickly download contents while preventing its unauthorized use.

While the preferred embodiments of the present invention have been described using specific terms, such description is for illustrative purposes only, and it is to be understood that changes and variations may be made without departing from the spirit or scope of the appended claims.

What is claimed is:

1. An information providing apparatus comprising:
a reception unit configured to receive a request message from a terminal, said request message identifies a key server and a key associated with predetermined content;
a controller configured to control whether to request said key from said key server based on the request message, so that the key server releases the key for use by the terminal when the controller makes the request; and
a transmission unit configured to transmit the request and associated key received by the reception unit to the key server.

2. The information providing apparatus according to claim 1, wherein said terminal is a portable device.

3. The information providing apparatus according to claim 1, wherein said predetermined content and said key are for use in making contents data available to the terminal.

4. An information providing method comprising:
receiving a request message from a terminal, said request message identifying a key server and a key associated with predetermined content;
controlling whether to request said key from said key server based on said request message;
transmitting the request and associated key of the received request message to the key server; and
releasing the key from the key server for use by the terminal when the request is made in the controlling step.

5. The information providing method according to claim 4, wherein said terminal is a portable device.

6. The information providing method according to claim 4, wherein said predetermined content and said key are for use in making contents data available to the terminal.

7. A program storage medium for storing a computer-readable program that, when executed by a processor, implements a method, comprising:
receiving a request message from a terminal, said request message identifying a key server and a key associated with predetermined content;
controlling whether to request said key from said key server based on said request message;
transmitting the request and associated key of the received request message to the key server; and
releasing the key from the key server for use by the terminal when the request is made in the controlling step.

8. An information processing apparatus comprising:
a transmission controller configured to control transmission of a transmission request to an information providing unit for data, said transmission request identifying a key server and a key associated with predetermined contents, the transmission request is transmitted to the key server via the information providing unit;
a reception controller configured to control reception of the key from the key server for use by a terminal to access said predetermined contents.

9. The information processing apparatus according to claim 8, wherein the transmission request is sent to an authentication server.

10. The information processing apparatus according to claim 8, wherein said data and said key are for use in making contents data available for use in the terminal.

11. An information processing method comprising the steps of:
controlling transmission of a transmission request to an information providing unit for data, said transmission request identifying a key server and a key associated with predetermined contents, the transmission request is transmitted to the key server via the information providing unit; and
controlling reception of the key from the key server for use by a terminal to access said predetermined contents.

12. The information processing method according to claim 11, wherein said step of controlling transmission includes transmitting the transmission request to an authentication server.

13. The information processing method according to claim 11, wherein said data and said key are for use in making contents data available.

14. A program storage medium storing a computer-readable program that, when executed by a processor, implements a method comprising the steps of:
controlling transmission of a transmission request to an information providing unit for data, said transmission request identifying a key server and a key associated with predetermined contents, the transmission request is transmitted to the key server via the information providing unit; and
controlling reception of the key from the key server for use by a terminal to access said predetermined contents.

* * * * *